United States Patent Office 3,687,849
Patented Aug. 29, 1972

3,687,849
LUBRICANTS CONTAINING OIL-SOLUBLE GRAFT POLYMERS DERIVED FROM DEGRADED ETHYLENE-PROPYLENE INTERPOLYMERS
Franklin Paul Abbott, Brooklyn, Ohio, assignor to The Lubrizol Corporation, Wickliffe, Ohio
No Drawing. Continuation-in-part of application Ser. No. No. 737,838, June 18, 1968, and Ser. No. 76,247, Sept. 28, 1970. This application Jan. 18, 1971, Ser. No. 107,489
Int. Cl. C10m 1/36, 1/38
U.S. Cl. 252—47.5
8 Claims

ABSTRACT OF THE DISCLOSURE

Graft polymers are prepared from various polymerizable unsaturated monomers and an oxidized, degraded interpolymer of ethylene and propylene. These polymers are useful as viscosity index improvers, dispersants and pour point depressants for fuels and lubricants.

---

This application is a continuation-in-part of copending applications Ser. No. 737,838, filed June 18, 1968, now abandoned and Ser. No. 76,247, filed Sept. 28, 1970 now abandoned.

This invention relates to new polymeric compositions of matter useful as viscosity index improvers, dispersants and pour point depressants in lubricating and fuel oils. More particularly, it relates to oil-soluble polymers containing units derived from a polymerizable (1) ester of an unsaturated alcohol, (2) ester of an aminoalcohol or alkanediol with an unsaturated acid, (3) oxygen- or sulfur-containing vinyl heterocyclic compound, (4) unsaturated ether, (5) unsaturated ketone or (6) unsaturated N-oxohydrocarbon-substituted or sulfohydrocarbon-substituted amide, said units being grafted on an oxidized, degraded interpolymer of ethylene and propylene which has a molecular weight of at least about 1000 and which is formed by contacting an ethylene-propylene interpolymer with oxygen at a temperature of at least 140° C. for a period of time sufficient to effect a substantial reduction in the molecular weight of said interpolymer.

The use of additives of various kinds in lubricating oils and fuels is well known. In particular, many such additives are known which improve the viscosity properties of a lubricant by decreasing its tendency to change viscosity with a change in temperature. Many other additives have the effect of dispersing sludge, varnish and similar insoluble impurities which develop in a lubricant or on engine parts with continued use of the lubricant, particularly at low temperatures such as those encountered in stop-and-go driving which is prevalent in urban centers. Still other additives function as pour point depressants.

Some additives are known which combine dispersancy with viscosity index-improving and/or pour point depressing properties. However, there is still considerable interest in developing improved additives of this type.

A principal object of the present invention, therefore, is to provide novel polymeric compositions of matter.

Another object is to provide polymers which are useful as lubricant and fuel additives.

Still another object is to provide lubricants with improved viscosity, dispersancy and pour point depressing characteristics.

Other objects will in part be obvious and will in part appear hereinafter.

The oxidized, degraded interpolymers (hereinafter sometimes referred to merely as "the degraded interpolymers") useful for preparing the compositions of this invention are derived principally from ethylene and propylene. They may include minor amounts, i.e., up to about 10% based on the molar amounts of monomeric ethylene and propylene units in the interpolymer, of polymerized units derived from other monomers. Examples of such other monomers include polymerizable mono-olefins having at least 4 carbon atoms such as 1-butene, 1-pentene, 2-butene, 3-hexene, 4-methyl-1-pentene, 1-decene, 1-nonene, 2-methylpropene, and 1-dodecene. They also include polymerizable polyenes; e.g., conjugated polyenes such as butadiene, isoprene, piperylene, 1,3-hexadiene, 1,3-octadiene, 2,4-decadiene, etc., and non-conjugated polyenes such as 3,3-dimethyl-1,5-hexadiene, 1,9-decadiene, dicyclopentadiene, 1,19-eicosadiene, 1,4-pentadiene, 1,5-hexadiene, etc. The non-conjugated dienes are especially useful. For the most part, such other monomers contain about 4–12 carbon atoms although they may contain as many as 25 carbon atoms.

Interpolymers containing about 20–70 mole percent propylene units, about 30–80 mole percent ethylene units and up to about 10 mole percent of other olefin units are especially useful and those containing about 25–50 mole percent of propylene, about 50–75 mole percent of ethylene and about 1–10 mole percent of non-conjugated diene units are preferred.

The interpolymers from which the degraded polymers are derived usually have molecular weights of about 50,000–800,000, although polymers of higher molecular weight may sometimes be used. Those having molecular weights of about 80,000–600,000 are especially useful.

The degraded interpolymers are prepared most conveniently by heating an interpolymer such as illustrated above, or a fluid solution of such interpolymer in an inert solvent, at a temperature of at least about 140° C. in the presence of oxygen or air. A mixture of oxygen and an inert gas such as nitrogen or carbon dioxide may be used. The inert gas then functions as a carrier of oxygen and often provides a convenient means of introducing oxygen into the reaction mixture.

The oxygen or air may be introduced by bubbling it through the polymer solution. However, it is frequently preferred to merely blow air over the surface of the solution while subjecting it to vigorous shearing agitation.

The inert solvent used in preparing the fluid solution of the interpolymer is preferably a liquid hydrocarbon such as naphtha, hexane, cyclohexane, dodecane, mineral oil, biphenyl, xylene or toluene, an ether such as diphenyl oxide, or a similar non-polar solvent. The amount of the solvent is not critical so long as a sufficient amount is used to result in the fluid solution of the interpolymer. Such solution usually contains about 60–95% of the solvent.

The temperature at which the interpolymer is degraded is at least about 140° C. and may be as high as 200° C., 300° C. or even higher.

Degradation of the interpolymer is characterized by a substantial reduction of its molecular weight. The mechanism by which the interpolymer is degraded is not precisely known nor is the chemical composition of the degraded product. It is known, however, from infrared analysis that the product contains oxygen in the form of carboxylic acid, ester and carbonyl groups. A degraded interpolymer having a molecular weight of at least about 1000, which has been degraded to the extent that its molecular weight is at least about 5% less than the molecular weight of the interpolymer before degradation, is useful for the purposes of this invention. An interpolymer having a molecular weight of about 3000–200,000, preferably 3000–5000, is preferred.

The comonomers which are grafted on the degraded interpolymer to form the polymers of the present invention include (1) esters of unsaturated alcohols, (2) esters of aminoalcohols or alkanediols with unsaturated acids, (3) vinyl heterocyclic compounds, (4) unsaturated ethers, (5) unsaturated ketones, and (6) N-oxohydrocarbon or sulfohydrocarbon-substituted unsaturated amides. Specific illustrations of such compounds are:

(1) Esters of unsaturated alcohols: allyl, methallyl, crotyl, 1-chloroallyl, 2-chloroallyl, cinnamyl, vinyl, methylvinyl, 1-phenallyl, butenyl, etc., esters of (a) saturated acids such as acetic, propionic, butyric, valeric, caproic, stearic; (b) unsaturated acids such as acrylic, alpha-substituted acrylic (including alkylacrylic, e.g., methacrylic, ethylacrylic, propylacrylic, and arylacrylic such as phenylacrylic), crotonic, oleic, linoleic, linolenic; (c) polybasic acids such as oxalic, malonic, succinic, glutaric, adipic, pimelic, suberic, azelaic, sebacic; (d) unsaturated polybasic acids such as maleic, fumaric, citraconic, mesaconic, itaconic, methylenemalonic, acetylenedicarboxylic; aconitic; (e) aromatic acids, e.g., benzoic, phenylacetic, phthalic, terephthalic and benzoylphthalic.

(2) Esters of alcohols such as ethanolamine, ethylene glycol, diethylene glycol, diethanolaminoethanol and similar polyhydroxy compounds and amino alcohols with unsaturated alphatic monobasic and polybasic acids, examples of which are illustrated above.

(3) Oxygen- or sulfur-containing vinyl heterocyclic compounds including vinylfuran, vinylbenzofuran, N-vinylpyrrolidone, N-vinylthiopyrrolidone and N-vinyloxazolidone.

(4) Unsaturated ethers such as methyl vinyl ether, ethyl vinyl ether, cyclohexyl vinyl ether, octyl vinyl ether, diallyl ether, ethyl methallyl ether and allyl ethyl ether.

(5) Unsaturated ketones, e.g., methyl vinyl ketone, ethyl vinyl ketone.

(6) Unsaturated N-oxohydrocarbon-substituted or sulfohydrocarbon amides, such as diacetone acrylamide, diacetophenone acrylamide, 2-acrylamidopropanesulfonic acid, 2-acrylamido-2-methylpropanesulfonic acid and 2-acrylamido-2-phenylethanesulfonic acid.

The preferred comonomers are vinyl esters of saturated carboxylic acids, illustrated by vinyl acetate and the vinyl ester of an acid of the formula

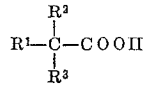

wherein $R^{1-3}$ are saturated alkyl groups, said acid containing about 10 carbon atoms; aminoalkyl or hydroxyalkyl acrylates and methacrylates; N-vinyl lactams such as N-vinylpyrrolidone or thiolactams such as N-vinylthiopyrrolidone; and N-oxohydrocarbon or sulfohydrocarbon acrylamides.

The polymers of this invention are obtained by contacting the degraded interpolymer with the desired comonomer in the presence of a free radical polymerization catalyst at a temperature of at least about 50° C., preferably about 55–135° C. Suitable catalysts include cumene hydroperoxide, dicumyl peroxide, benzoyl peroxide, azobisisobutyronitrile, sodium persulfate, diethyl peroxydicarbonate, tertiary butyl peroxide and the like. The polymerization may be effected in bulk or in solution in a suitable solvent, ordinarily the same solvent used for preparation of the degraded interpolymer.

Alternatively, the degradation and grafting steps can be effected simultaneously by heating the interpolymer with the monomer, in the presence of oxygen and the polymerization catalyst, at a temperature above about 100° C. If the reaction is effected at about 190–250° C., the catalyst is frequently unnecessary.

The polymers of this invention may contain up to about 40% (by weight) grafted units, with the remainder being degraded base polymer units.

The precise structure of the graft polymers of this invention is not known. In particular, it is not certain whether the grafted groups are attached to a carbon or oxygen atom of the degraded interpolymer chain. In all likelihood, both types of bonding are present in varying proportions. The present invention is not limited to any particular molecular structure of the polymer.

The preparation of the polymers of this invention is illustrated by the following examples. All parts, ratios and percentages are by weight.

EXAMPLE 1

A 50% solution in xylene of a terpolymer of ethylene (about 46.1%), propylene (about 51.1%) and 1,4-hexadiene (about 2.8%), which has a molecular weight (RSV) of about 125,000, is degraded by bubbling air through it for 5 hours at 230° C.

To 100 parts of the degraded polymer solution is added 5 parts of diethylaminoethyl methacrylate (containing 0.3% phenyl-β-naphthylamine). Azobisisobutyronitrile, 0.1 part, is added and the solution is heated for 5½ hours at 120–140° C. Two additional 0.1-part portions of azobisisobutyronitrile are added during the heating. After the reaction is complete, the solvent is removed at 230° C., the latter part of the removal being effected under vacuum. The resulting polymer is filtered and dissolved in xylene to form a 50% solution of the desired 10:90 graft interpolymer of diethylaminoethyl methacrylate and the degraded terpolymer.

EXAMPLE 2

A solution, in 1700 parts of a low viscosity naphthenic oil, of 300 parts of a rubbery terpolymer (in crumb form) of ethylene, propylene and dicyclopentadiene having a Mooney viscosity of 80–95 (100° C.) and a percentage composition similar to that of Example 1 is heated to 140° C. under nitrogen, with vigorous stirring. Five parts of a $C_{12-14}$ tertiary alkyl primary amine mixture is added to inhibit darkening of the solution during degradation, and air is blown over the reaction mixture at 140–150° C. for 6¾ hours. After one hour, an additional five parts of tertiary alkyl primary amine mixture is added. The degraded polymer thus formed is heated to 110° C./5 mm. to remove the amine and is then filtered.

To 300 parts of the degraded polymer solution, maintained at 65° C. under nitrogen, is added 0.22 part of benzoyl peroxide. 2-diethylaminoethyl methacrylate, 12 parts, is added followed by 0.11 part of azobisisobutyronitrile, and the mixture is heated for three hours at 70–80° C. Another 0.11 part of azobisisobutyronitrile is added and heating is continued for an additional three hours. The solution thus obtained is stripped under vacuum to remove volatile constituents. There is obtained an 18.3% solution of the desired 20:80 graft interpolymer of 2-diethylaminoethyl methacrylate and the degraded terpolymer.

EXAMPLE 3

Following the procedure of Example 2, a graft interpolymer is prepared from 300 parts of the degraded terpolymer solution and 12 parts of 2-hydroxyethyl methacrylate. The polymerization catalyst is 0.44 part of benzoyl peroxide, added in one initial portion of 0.22 part and two subsequent portions of 0.11 part each.

EXAMPLE 4

The terpolymer used is similar to that of Example 2 except that it has a lower molecular weight and a Mooney viscosity (100° C.) of 50–65. Following the procedure of Example 2, 300 parts of a 15% solution of the terpolymer in an alkylbenzene solvent (wherein the alkyl groups contain about 10–15 carbon atoms) is degraded and reacted with 9 parts of vinyl acetate. There is obtained a 17.5% solution of the desired 80:20 graft interpolymer.

EXAMPLE 5

A solution of 300 parts of the ethylene-propylene-dicyclopentadiene terpolymer solution of Example 2 is heated under nitrogen at 150° C., and 9 parts of vinyl acetate is added. The solution is blown with air and heated to 190–200° C. for 3 hours. It is then stripped under vacuum to remove volatile constituents. The product is the desired 17.4% solution of a 20:80 graft interpolymer of vinyl acetate and the terpolymer.

EXAMPLE 6

A degraded terpolymer is prepared by the method of Example 2 except that no tertiary alkyl primary amine is added. To 700 parts of said interpolymer, at 100° C., is added 2 parts of di-t-butyl peroxide. The mixture is heated to 110° C. for one-half hour, and then 70 parts of vinyl acetate and an additional 2 parts of di-t-butyl peroxide are added. The mixture is heated at 140° C. for 6½ hours and diluted with 199 parts of low viscosity naphthenic oil. It is then heated under vacuum at 130° C. to remove volatile constituents. The product is the desired 87% solution of a 40:60 graft copolymer of vinyl acetate with the degraded terpolymer.

EXAMPLE 7

To 500 parts of the degraded interpolymer of Example 6 is added 0.44 part of benzoyl peroxide; the mixture is heated to 70° C. and there are added 13.2 parts of N-vinylpyrrolidone and 0.18 part of azobisisobutyronitrile. The mixture is heated for 4 hours at 70° C., after which time an additional 0.18 part of azobisisobutyronitrile is added and heating is continued at 80° C. for 3 hours. Volatile materials are then removed by heating at 70° C. under vacuum, yielding an 84.2% solution in mineral oil of the desired 15:85 graft copolymer of N-vinylpyrrolidone and the degraded terpolymer.

EXAMPLE 8

Following the procedure of Example 4, a graft interpolymer is prepared from 150 parts of an oxidized, degraded terpolymer solution, 4.5 parts of N-vinylpyrrolidone and 0.4 part of benzoyl peroxide. The product is a 15% solution in the alkylbenzene solvent.

EXAMPLE 9

To 500 parts of the degraded terpolymer solution of Example 2 is added 0.37 part of benzoyl peroxide. The mixture is heated at 70° C. under nitrogen and 9 parts of methacrylic acid is added over 5 minutes. The solution is heated at 70–78° C. for 6 hours, during which time two additional portions of 0.18 part each of benzoyl peroxide are added. The solution is then vacuum distilled to remove volatile constituents.

To the intermediate thus prepared is added 9 parts of aminopropylmorpholine. The mixture is heated for 2 hours at 150–160° C. and then is dissolved in toluene and heated under reflux. The volatile materials are removed by vacuum distillation, yielding an 18% solution of the desired amine reaction product of the graft interpolymer of methacrylic acid with the degraded terpolymer.

EXAMPLE 10

Following the procedure of Example 2, a 7.5:92.5 graft interpolymer of N-(1,1-dimethyl-3-oxobutyl)acrylamide and the degraded terpolymer is prepared. The polymerization catalyst consists of 1.5 parts each of benzoyl peroxide and azobiisobutyronitrile.

EXAMPLE 11

Following the procedure of Example 2, a 15:85 graft interpolymer of N-(1,1-dimethyl-3-oxobutyl)acrylamide and the degraded terpolymer is prepared. The polymer is obtained as a 17.2% solution.

EXAMPLE 12

Following the procedure of Example 10, a 20:80 interpolymer is prepared from the same reactants. It is obtained as a 16% solution.

EXAMPLE 13

To 500 parts of the degraded polymer solution of Example 2, at 85–90° C., is added 0.5 part of benzoyl peroxide. There are then added 25 parts of the vinyl ester of an acid of the formula

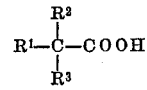

wherein $R^{1-3}$ are saturated alkyl groups, said acid containing about 10 carbon atoms, and an additional 0.5 part of benzoyl peroxide. Polymerization is effected at 80–110° C. over 5 hours, with two additional 0.5-part portions of benzoyl peroxide being added. The volatile materials are then removed by heating at 88° C. at 1 mm. pressure, and 35 parts of mineral oil is added. The desired 75:25 graft polymer of the degraded ethylene-propylene-dicyclopentadiene terpolymer and the vinyl ester is obtained as a 19% solution in oil.

EXAMPLE 14

Following the procedure of Example 2, a 15% solution in decalin of the degraded ethylene-propylene-dicyclopentadiene terpolymer is prepared. To 1000 parts of this solution is added 12.5 parts of 2-acrylamido-2-methylpropane-1-sulfonic acid. The mixture is heated to 60° C. and 0.625 part of azobisisobutyronitrile is added. The temperature is increased to 140–150° C. for 5 hours as polymerization occurs. The mixture is filtered to yield a 16% solution in decalin of the desired 90:10 graft polymer of the degraded terpolymer and 2-acrylamido-2-methylpropane-1-sulfonic acid.

The grafting of polar monomers onto a degraded ethylene-propylene interpolymer improves the dimensional stability thereof. This is illustrated by thermal analysis of a film prepared by evaporation of decalin from the product of Example 14; the film has a transition temperature increment of 53° C., as compared to 10° C. for the non-grafted degraded polymer.

The polymers of this invention can be effectively employed in a variety of lubricating and fuel compositions based on diverse hydrocarbon fuels and oils of lubricating viscosity, including natural and synthetic lubricating oils and mixtures thereof. The lubricating compositions contemplated include principally crankcase lubricating oils for spark-ignited and compression-ignited internal combustion engines including automobile and truck engines, two-cycle engine lubricants, aviation piston engines, marine and railroad diesel engines, and the like. However, automatic transmission fluids, transaxle lubricants, gear lubricants, metal-working lubricants, hydraulic fluids, and other lubricating oil and grease compositions can benefit from the incorporation of the present polymers.

Natural oils include animal oils and vegetable oils (e.g., castor oil, lard oil) as well as solvent-refined or acid-refined mineral lubricating oils of the paraffinic, naphthenic, or mixed paraffinic-naphthenic types. Oils of lubricating viscosity derived from coal or shale are also useful base oils. Synthetic lubricating oils include hydrocarbon oils and halo-substituted hydrocarbon oils such as polymerized and interpolymerized olefins (e.g., polybutylenes, polypropylenes, propylene-isobutylene copolymers, chlorinated polybutylenes, etc.); alkyl benzenes (e.g., dodecylbenzenes, tetradecylbenzene, dinonylbenzenes, di-(2-ethylhexyl)benzenes, etc.); polyphenyls (e.g., biphenyls, terphenyls, etc.); and the like. Alkylene oxide polymers and interpolymers and derivatives thereof where the terminal hydroxyl groups have been modified by esterification, etherification, etc., constitute another class of known synthetic lubricating oils. These are exemplified by the oils prepared through polymerization of ethylene oxide or propylene oxide, the alkyl and aryl ethers of these polyoxyalkylene polymers (e.g., methylpolyisopropylene glycol ether having an average molecular weight of 1000, diphenyl ether of polyethylene glycol having a molecular weight of 500–1000, diethyl ether of polypropylene glycol having a molecular weight of 1000–1500, etc.) or mono- and polycarboxylic esters thereof, for example, the acetic acid esters, mixed $C_3$–$C_8$ fatty acid esters, or the $C_{13}$ oxo acid diester of tetraethylene glycol. Another suitable class of synthetic lubricating oils comprises the esters of dicarboxylic acids (e.g., phthalic acid, succinic acid, maleic acid, azelaic acid, suberic acid, sebacic acid, fumaric acid, adipic acid, linoleic acid dimer, etc.) with a variety of alcohols (e.g., butyl alcohol, hexyl alcohol, dodecyl alcohol, 2-ethylhexyl alcohol, pentaerythritol, etc.). Specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid, and the like. Silicon-based oils such as the polyalkyl-, polyaryl-, polyalkoxy-, or polyaryloxysiloxane oils and silicate oils comprise another useful class of synthetic lubricants (e.g., tetraethyl silicate, tetraisopropyl silicate, tetra-(2-ethylhexyl) silicate, tetra-(4-methyl-2-tetraethyl) silicate, tetra-(p-tert-butylphenyl) silicate, hexyl-(4-methyl-2-pentoxy)-disiloxane, poly(methyl)-siloxanes, poly(methylphenyl)-siloxanes, etc.). Other synthetic lubricating oils include liquid esters of phosphorus-containing acids (e.g., tricresyl phosphate, trioctyl phosphate, diethyl ester of decane phosphonic acid, etc.), polymeric tetrahydrofurans, and the like.

In general, about 0.01–10.0 parts (by weight) of the polymer of this invention is dissolved in 100 parts of a hydrocarbon fuel, and about 0.05–20.0 parts of said polymer is dissolved in 100 parts of oil to produce a satisfactory lubricant. The invention also contemplates the use of other additives in combination with the products of this invention. Such additives include, for example, auxiliary detergents and dispersants of the ash-containing or ashless type, oxidation inhibiting agents, pour point depressing agents, extreme pressure agents, color stabilizers and anti-foam agents.

The ash-containing detergents are exemplified by oil-soluble neutral and basic salts of alkali or alkaline earth metals with sulfonic acids, carboxylic acids, or organic phosphorus acids characterized by at least one direct carbon-to-phosphorus linkage such as those prepared by the treatment of an olefin polymer (e.g., polyisobutene having a molecular weight of 1000) with a phosphorizing agent such as phosphorus trichloride, phosphorus heptasulfide, phosphorus pentasulfide, phosphorus trichloride and sulfur, white phosphorus and a sulfur halide, or phosphorothioic chloride. The most commonly used salts of such acids are those of sodium, potassium, lithium, calcium, magnesium, strontium and barium.

The term "basic salt" is used to designate metal salts wherein the metal is present in stoichiometrically larger amounts than the organic acid radical. The commonly employed methods for preparing the basic salts involve heating a mineral oil solution of an acid with a stoichiometric excess of a metal neutralizing agent such as the metal oxide, hydroxide, carbonate, bicarbonate, or sulfide at a temperature above 50° C. and filtering the resulting mass. The use of a "promoter" in the neutralization step to aid the incorporation of a large excess of metal likewise is known. Examples of compounds useful as the promoter include phenolic substances such as phenol, naphthol, alkylphenol, thiophenol, sulfurized alkylphenol, and condensation products of formaldehyde with a phenolic substance; alcohols such as methanol, 2-propanol, octyl alcohol, cellosolve, carbitol, ethylene glycol, stearyl alcohol, and cyclohexyl alcohol; and amines such as aniline, phenylenediamine, phenothiazine, phenyl-β-naphthylamine, and dodecylamine. A particularly effective method for preparing the basic salts comprises mixing an acid with an excess of a basic alkaline earth metal neutralizing agent, a phenolic promoter compound, and a small amount of water and carbonating the mixture at an elevated temperature such as 60–200° C.

Ashless detergents and dispersants are illustrated by the acylated polyamines and similar nitrogen compounds containing at least about 54 carbon atoms as described in U.S. Pat. 3,272,746; reaction products of such compounds with other reagents including boron compounds, phosphorus compounds, epoxides, aldehydes, organic acids and the like; and esters of hydrocarbon-substituted succinic acids as described in U.S. Pat. 3,381,022.

Extreme pressure agents and corrosion-inhibiting and oxidation-inhibiting agents are exemplified by chlorinated aliphatic hydrocarbons such as chlorinated wax; organic sulfides and polysulfides such as benzyl disulfide, bis-(chlorobenzyl) disulfide, dibutyl tetrasulfide, sulfurized sperm oil, sulfurized methyl ester of oleic acid, sulfurized alkylphenol, sulfurized dipentene, and sulfurized terpene; phosphosulfurized hydrocarbons such as the reaction product of a phosphorus sulfide with turpentine or methyl oleate; phosphorus esters including principally dihydrocarbon and trihydrocarbon phosphites such as dibutyl phosphite, diheptyl phosphite, dicyclohexyl phosphite, pentyl phenyl phosphite, dipentyl phenyl phosphite, tridecyl phosphite, distearyl phosphite, dimethyl naphthyl phosphite, oleyl 4-pentylpenyl phosphite, polypropylene (molecular weight 500)-substituted phenyl phosphite, diisobutyl-substituted phenyl phosphite; metal thiocarbamates, such as zinc dioctyldithiocarbamate and barium heptylphenyl dithiocarbamate; Group II metal phosphorodithioates such as zinc dicyclohexylphosphorodithioate, zinc dioctylphosphorodithioate, barium di(heptylphenyl)phosphorodithioate, cadmium dinonylphosphorodithioate, and the zinc salt of a phosphorodithioic acid produced by the reaction of phosphorus pentasulfide with an equimolar mixture of isopropyl alcohol and n-hexyl alcohol.

The utility of the polymers of this invention as viscosity index improvers in mineral oils is shown in Table I which lists viscosity indices ($VI_E$, calculated according to ASTM method D2270) for a lubricant prepared from a base oil having a viscosity of 180 SUS at 100° F., and containing the polymers of this invention in the indicated percentages (calculated as percentage chemical, despite the fact that the polymer is in oil solution). The lubricant also contains 0.96% of a basic calcium petroleum sulfonate, 1.89% of a pentaerythritol ester of polyisobutenyl succinic acid, 0.74% of a mixed zinc salt of isobutyl- and primary amylphosphorodithioic acids, 0.25% or 0.50% (as specified in Table I) of a pour point depressant comprising a terpolymer of vinyl acetate, ethyl vinyl ether and a mixture of $C_{12-14}$ alkyl fumarates, and 0.006% of a silicone anti-foam agent.

TABLE I

| Polymer of this invention | | Pour point depressant concentration, percent | Viscosity index |
|---|---|---|---|
| Identity | Concentration, percent | | |
| Product of Example: | | | |
| 2 | 1.25 | 0.25 | 132 |
| 3 | 1.25 | 0.25 | 134 |
| 5 | 1.0 | 0.25 | 134 |
| 9 | 1.25 | 0.25 | 132 |
| 11 | 1.25 | 0.25 | 139 |
| 12 | 1.25 | 0.50 | 137 |

The dispersant characteristics of the polymers of this invention are evaluated in a test in which a lubricant containing the dispersant being tested is blended with a drain oil from an internal combustion engine, the drain oil constituting 30% by weight of the total volume. This mixture is then oxidized with air (at 0.5 cu. ft. per hour) for one week at 300° F. in the presence of a 2″ x 6″ metallic copper catalyst. After an intial oxidation period of 65 hours, a drop of the oil is placed on a piece of filter paper every 8 hours and the oil is allowed to spread. When the dispersancy of the sample has deteriorated, the spreading oil cannot carry the insolubles to the edge of the oil spot and failure is indicated by a dark sludge spot surrounded by a "halo" of oil. At this point, the duration of the test in hours is noted. The resulting values are compared with a control dispersant-viscosity index improver comprising a copolymer of an alkyl methacrylate and N-vinylpyrrolidone. The duration of the test (in hours) for the polymer being tested is divided by the duration for the control and the quotient thus obtained is multiplied by 100 to obtain the figures given in Table II below. The lubricant used for this test comprised a base oil with a viscosity at 100° F. of 200 SUS containing 0.89% of a basic calcium petroleum sulfonate, 0.56% of a pentaerythritol ester of polyisobutenyl succinic acid, and 0.70% of the zinc salt of mixed phosphorodithioic acids described above. The proportions of the polymers and the results of the test are given in Table II.

TABLE II

| Polymer | Concentration, percent chemical | Dispersancy rating |
|---|---|---|
| Control | 1.40 | 100 |
| Product of Example: | | |
| 2 | 1.43 | 113 |
| 10 | 1.32 | >125 |
| 12 | 1.25 | >125 |
| 13 | 1.25 | >166 |

The effectiveness of the polymers of this invention as pour point depressants for fuel oils is illustrated by the results of the ASTM Pour Point Test (D97); the pour point of a No. 2 fuel oil containing 0.04% by weight of the product of Example 7 is −45° F., as compared with −30° F. for the fuel oil alone.

The improved pour characteristics of fuel containing the polymers of this invention are also shown by the results of a modification of the Enjay Cold Flow Test. In this test, 1700 ml. of the fuel being tested is measured into a one-half gallon can stored in a cold box maintained at −20° to −21° F. for 16-24 hours. After the storage period, a copper tube having an outer diameter of $\frac{3}{16}''$ and an inner diameter of 0.098" is inserted into the sample approximately $\frac{1}{8}''$ from the bottom of the can. Care is taken during the insertion of the tube not to agitate the fuel oil or disturb any wax that may have precipitated. After about 5 minutes, which is sufficient to permit the copper tube to reach thermal equilibrium with the fuel, a vacuum of 12" of mercury is applied to the system. The fuel is discharged outside the cold box into a four-liter graduate and the volume of fuel collected is recorded each minute until the line plugs or all the fuel is removed from the can, whichever happens first. The flow rate in liters per hour and the percent recovery of fuel removed from the can are calculated. The results of the test are given in Table III.

TABLE III

| Polymer | Concentration, percent chemical | Flow rate, liters/hr. | Percent recovery |
|---|---|---|---|
| None | | 0 | 0 |
| Product of Example: | | | |
| 2 | 0.02 | 12 | 24 |
| 6 | 0.02 | 12 | 40 |

What is claimed is:

1. A lubricating composition comprising a major amount of a lubricating oil and a minor amount, sufficient to improve the viscosity index or dispersancy properties thereof, of an oil-soluble polymer containing units derived from a polymerizable (1) ester of an unsaturated alcohol with an aliphatic carboxylic acid, (2) ester of an aminoalcohol or alkanediol with an unsaturated aliphatic carboxylic acid, (3) vinyl furan, vinylbenzofuran, N-vinylpyrrolidone, N-vinylthiopyrrolidone or N-vinyloxazolidone, (4) unsaturated ether, (5) unsaturated ketone or (6) unsaturated N-oxohydrocarbon-substituted or N-sulfohydrocarbon-substituted amide, said units grafted on an oxidized, degraded interpolymer of ethylene and propylene which has a molecular weight of at least about 1000 and which is formed by contacting a solution in an inert solvent of an ethylene-propylene interpolymer with oxyen at a temperature of at least 140° C. for a period of time sufficient to effect a reduction of at least 5% in the molecular weight of said interpolymer.

2. A lubricating composition according to claim 1 wherein the polymerizable compound is a vinyl ester of a saturated carboxylic acid, an aminoalkyl or hydroxyalkyl acrylate or methacrylate, an N-vinyl lactam or thiolactam or an N-oxohydrocarbon susbstituted or N-sulfohydrocarbon-sustituted acrylamide.

3. A lubricating composition according to claim 2 wherein the interpolymer is a terpolymer of ethylene, propylene and a polymerizable conjugated diene.

4. A lubricating composition according to claim 3 wherein the terpolymer contains about 20–70 mole percent propylene units, about 30–80 mole percent ethylene units and about 1–10 mole percent diene units.

5. A lubricating composition according to claim 4 wherein the diene is dicyclopentadiene.

6. A lubricating composition according to claim 4 wherein the polymerizable monomer is diacetone acrylamide.

7. A lubricating composition according to claim 4 wherein the polymerizable monomer is vinyl acetate.

8. A lubricating composition according to claim 4 wherein the polymerizable monomer is N,N-diethylaminoethyl methacrylate.

References Cited

UNITED STATES PATENTS

| 3,458,597 | 7/1969 | Jabloner | 252—51.5 A |
| 3,341,455 | 9/1967 | Coleman | 252—51.5 A |
| 3,278,437 | 10/1966 | Lorensen et al. | 252—51.5 A |
| 3,316,177 | 4/1967 | Dorer | 252—51.5 A |

FOREIGN PATENTS

| 728,709 | 2/1966 | Canada | 252—51.5 A |

OTHER REFERENCES

Encyclopedia of Polymer Science and Technology, vol. 4 (1966), pp. 699–712.

DANIEL E. WYMAN, Primary Examiner

W. H. CANNON, Assistant Examiner

U.S. Cl. X.R.

252—52 R, 51, 51.5 A, 56 R